United States Patent [19]

Solomon et al.

[11] 4,456,521
[45] Jun. 26, 1984

[54] THREE LAYER LAMINATE

[75] Inventors: Frank Solomon, Great Neck, N.Y.; Charles Grun, Matawan, N.J.

[73] Assignee: Diamond Shamrock Corporation, Dallas, Tex.

[21] Appl. No.: 486,468

[22] Filed: Apr. 19, 1983

Related U.S. Application Data

[63] Continuation of Ser. No. 202,577, Oct. 31, 1980, abandoned.

[51] Int. Cl.³ ............... C25B 11/03; C25B 11/04
[52] U.S. Cl. .................... 204/292; 204/294; 429/42
[58] Field of Search ............ 429/42; 204/292, 294

[56] References Cited

U.S. PATENT DOCUMENTS

| | | | |
|---|---|---|---|
| 3,385,780 | 5/1968 | Feng | 204/294 |
| 3,553,029 | 1/1971 | Kordesch | 204/292 |
| 3,704,171 | 11/1972 | Landi | 429/42 |
| 3,838,092 | 9/1974 | Vogt | 260/33.6 F |
| 3,899,354 | 8/1975 | Kordesch | 204/294 |
| 4,058,482 | 11/1977 | Baris | 252/425.3 |
| 4,135,995 | 1/1979 | Welch | 204/93 |
| 4,150,076 | 4/1979 | Baris | 264/49 |
| 4,170,540 | 10/1979 | Lazarz | 204/296 |
| 4,235,748 | 11/1980 | Berchielle | 252/430 |

FOREIGN PATENT DOCUMENTS 1222172  2/1971  United Kingdom .

*Primary Examiner*—John F. Niebling
*Attorney, Agent, or Firm*—Arthur S. Collins

[57] ABSTRACT

The disclosure is directed to preparing three-layer laminated electrodes suitable for use as oxygen (air) cathodes in chlor-alkali and other electrochemical cells, fuel cells and in other electrochemical applications.

This three-layer laminate includes an active layer or sheet containing from about 60 to about 85 wt. % active carbon, the remainder being unsintered, fibrillated polytetrafluoroethylene in intimate admixture with said active carbon, said active layer laminated on its working surface to a current distributor and on its opposite surface to a porous, coherent, hydrophobic polytetrafluoroethylene-containing wetproofing layer.

3 Claims, No Drawings

THREE LAYER LAMINATE

This application is a continuation of application Ser. No. 202,577, filed Oct. 31, 1980 now abandoned.

BACKGROUND OF THE INVENTION AND PRIOR ART

Within the field of electrochemistry, there is a well known type of electrolytic cell known as a chlor-alkali cell. Basically this is a cell wherein chlorine gas an caustic soda, viz., sodium hydroxide, are produced by passing an electric current through a concentrated salt (brine) solution containing sodium chloride and water. A large portion of the chlorine and caustic soda for the chemical and plastic industries is produced in chlor-alkali cells.

Such cells are divided by a separator into anode and cathode compartments. The separator characteristically can be a substantially hydraulically impermeable membrane, e.g., a hydraulically impermeable cation exchange membrane such as the commercially available NAFION manufactured by the E. I. duPont de Nemours and Co. Alternatively the separator can be a porous diaphragm, e.g., asbestos which can be in the form of vacuum deposited fibers or asbestos paper sheet as are well known in the art. The anode can be a valve metal, e.g., titanium, provided with a precious metal coating to yield what is known in the art as a dimensionally stable anode. The cathodes employed in such chlor-alkali cells are subjected to the corrosive environment of the caustic soda and so special precautionary measures and techniques have been employed in an attempt to reduce damage and deactivation of the active layer particles contained in the cathodes used in chlor-alkali cells.

Fairly recently attention has been directed in chlor-alkali cell technology to various forms of oxygen (air) cathodes. Such cathodes can result in significant savings in the cost of electrical energy employed to operate chlor-alkali cells. Estimates indicate that there is a theoretical savings of about 25% of the total electrical energy required to operate chlor-alkali cells provided that the formation of molecular hydrogen gas at the cathode can be prevented. In other words about 25% of the electrical energy employed in a chlor-alkali cell is used to form hydrogen at the cathode. Hence the prevention of hydrogen formation at the cathode can lead to significant savings in the cost of electrical power. This is one of the major benefits of and purposes for oxygen (air) cathodes. However, such cathodes, being in contact with the electrolyte caustic soda, are subjected to the corrosive action thereof.

One known form of oxygen (air) cathode involves use of an active cathode layer containing porous active carbon particles whose activity in promoting the formation of hydroxide may or may not be catalyzed using precious metal catalyst materials, such as, silver, platinum, etc. The active carbon particles become wetted (flooded) by the caustic soda thereby significantly reducing their ability to eliminate the formation of hydrogen at the cathode and resulting in a loss of activity of the air cathode. Some attempts to overcome this difficulty involve incorporating hydrophobic materials, e.g., polytetrafluoroethylene (PTFE) in such active layers in particulate or fibrillated (greatly attenuated and elongated form) to impart hydrophobicity to the active carbon layer, per se. With the PTFE, however, comes the problem of reduced electrical conductivity in the cathode active layer in as much as PTFE, per se, is non-conductive when compared with the porous active carbon particles. Some oxygen (air) cathodes contain PTFE in both the active layer and in a backing sheet laminated thereto. The PTFE has been employed in particulate or fibrillated (greatly attenuated and elongated) form to impart hydrophobicity to the desired layer. Thus it can be seen that the development of corrosion-resistant oxygen (air) cathodes of improved durability for use in conjunction with chlor-alkali cells is an overall objective in the oxygen (air) cathode field.

U.S. Pat. No. 4,058,482 discloses a sheet material, principally comprised of a polymer such as PTFE and a pore-forming material wherein the sheet is formed of co-agglomerates of the polymer and the pore former. This patent teaches mixing polymer particles with positively charged particles of a pore former, e.g., zinc oxide, to form co-agglomerates thereof followed by mixing same with a catalyst suspension so as to form co-agglomerates of catalyst and polymer-pore-former agglomerates followed by pressing, drying, and sintering these co-agglomerates. Subsequent to this sintering, the pore former can be leached out of the electrodes.

U.S. Pat. No. 4,150,076 (a division of U.S. Pat. No. 4,058,482), is directed to the process for forming the sheet of U.S. Pat. No. 4,058,482, said process involving formation of polymer-pore-former co-agglomerates, distributing same as a layer on a suitable electrode support plate, for example a carbon paper, to form a fuel cell electrode by a process which includes pressing, drying, sintering, and leaching.

U.S. Pat. No. 4,170,540 to Lazarz et al discloses microporous membrane material suitable for electrolytic cell utilization and formed by blending particulate polytetrafluoroethylene, a dry pore-forming particulate material, and an organic lubricant. These three materials are milled and formed into a sheet which is rolled to the desired thickness, sintered, and subjected to leaching of the pore-forming material. According to the present invention, when forming the sheet by passing the fibrillated mixture of PTFE-particulate pore-forming agent through the rollers, special care is taken to avoid conditions which would cause the PTFE to sinter. The present invention is clearly distinguishable from U.S. Pat. No. 4,170,540 in respect of preparation of the backing sheet.

British Pat. No. 1,284,054 to Boden et al, is directed to forming an air-breathing electrode containing an electrolyte within an air-depolarized cell. This air-breathing electrode is made by hot pressing a fluoropolymer sheet containing a pore-forming agent on to a catalyst composition (containing silver) and a metallic grid member. According to page 3 of said British patent, the PTFE-pore-forming agent-paraffin wax containing sheet, is subjected to a solvent wash to remove the paraffin wax and then sintered in a sintering furnace at the appropriate temperatures for sintering the fluorocarbon polymer. After the PTFE-containing sheet is sintered and while it still contains the pore-forming particles, it is then ready for application to the catalyst composition of the air electrode for the hot pressing operation. Hot pressing involves the use of pressures ranging from about 5,000 to about 30,000 psi in conjunction with temperatures ranging from about 200° F. to 400° F.

The process of the present invention is readily distinguishable from British Pat. No. 1,284,054 in that the present invention avoids the use of a wax, avoids the trouble and expense of removing the wax with a solvent wash and does not use sintering thereby imparting greater porosity to the PTFE in fibrillated form in the finished electrode. Additionally the present invention avoids the repeated stripping-folding over-rolling again procedures required in all the examples of British Pat. No. 1,284,054. It will be observed that one of the backing layers which can be laminated according to the present invention surprisingly allows the formation of a porous, self-sustaining, coherent backing sheet or layer of PTFE using only a single pass through rollers.

U.S. Pat. No. 3,385,780 to I-Ming Feng discloses a thin, porous electrode consisting of a thin layer of a polytetrafluoroethylene pressed against a thin layer of polytetrafluoroethylene containing finely divided platinized carbon, the platinum being present in amounts of 1.2 to 0.1 mg/cm$^2$ in the electrically conductive face of the thin electrode, viz., the side containing the platinized carbon, viz., the active layer. A thermally decomposable filler material can be used, or the filler can be a material capable of being leached out by either a strong base or an acid. U.S. Pat. No. 3,385,780 also mentions a single unit electrode involving finely divided carbon in mixture with PTFE.

In accordance with one embodiment of this invention in respect of the backing layer, partially fluorinated acetylene black carbon particles are incorporated with the PTFE in the backing layer thereby resulting in improved electrical conductivity in the backing layer combined with balanced hydrophobicity.

U.S. Pat. No. 4,135,995 to Cletus N. Welch is directed to a cathode having a hydrophilic portion formed of a solid intercalation compound of fluorine and carbon of the empirical formula $CF_x$, where x ranges from about 0.25 to 1 and preferably ranges from about 0.25 to 0.7. The intercalation compounds of carbon and fluorine are referred to as hydrophilic, fluorinated graphites and graphite fluorides characterized by an infra-red spectrum showing an absorption band at 1220 cm$^{-1}$. A layer of hydrophobic material, such as polyperfluoroethylene (polytetrafluoroethylene) can be utilized in a hyrophobic portion of the same layer or it can be utilized in the form of a different layer which can be associated with a current carrier layer. The Welch cathode may be utilized as an oxygen (air) cathode.

The present invention in respect of the backing layer is readily distinguishable from that of the Welch patents (when incorporating partially fluorinated acetylene carbon black particles) in several respects. First, the partially fluorinated compounds utilized in accordance with this invention have a hydrophobicity greater than that of the acetylene carbon black prior to partial fluorination. Secondly, the partially fluorinated compounds which can be utilized in accordance with one embodiment of this invention are acetylene carbon blacks of the formula $CF_x$, wherein x ranges from about 0.1 to 0.18. Hence the extent of fluorination is markedly less in these partially fluorinated compounds as compared with those disclosed by said Welch patent. Thirdly it will be observed that the Welch intercalation compounds are fluorinated graphites or graphite fluorides. The partially fluorinated acetylene carbon black compounds which can be used in the laminates of this invention are partially fluorinated carbon-black, e.g. acetylene black, which acetylene blacks are produced by the explosive or thermal cracking of acetylene, or by corresponding electrical procedures. Such acetylene carbon blacks show significant differences when compared with graphitic blacks and active carbons due to their structure and history of production.

U.S. Pat. No. 3,838,064 to John W. Vogt et al is directed to a process for dust control involving mixing a finely divided fibrillatable polytetrafluoroethylene with a material which characteristically forms a dust to form a dry mixture followed by sufficient working to essentially avoid dusting. Very small concentrations of PTFE, e.g., from about 0.02 to about 3% by weight are employed to achieve the dust control. Corresponding U.S. Pat. No. 3,838,092 also to Vogt et al is directed to dustless compositions containing fibrous polytetrafluoroethylene in concentrations of about 0.02% to less than 1%, e.g., about 0.75% by weight of PTFE based on total solids.

The active layers whose use is contemplated to form the laminated three-layer electrodes in accordance with this invention are readily distinguishable from both the John W. Vogt et al patents (U.S. Pat. Nos. 3,838,064 and 3,838,092) and employ much higher concentrations of PTFE and for different purposes than are taught by said Vogt et al patents.

An article entitled "ON THE EFFECT OF VARIOUS ACTIVE CARBON CATALYSTS ON THE BEHAVIOR OF CARBON GAS-DIFFUSION AIR ELECTRODES: 1. ALKALINE SOLUTIONS" by I. Iliev et al appearing in the Journal of Power Sources, 1 (1976/1977) 35, 46, Elsevier Sequoia S.A., Lausanne-printed in the Netherlands, at pages 35 to 46 of said Journal there are described double layer fixed-zone, Teflon-bonded carbon electrodes having a gas supplying layer of carbon black "XC" wet proofed with 35% Teflon and an active layer consisting of a 30 mg/cm$^2$ mixture of the same wet-proof material "XC-35" and active carbon "weight ratio of 1:2.5.". These electrodes were sintered at 350° C. under a pressure of 200 kg/cm$^2$ and employed as oxygen (air) cathodes in alkaline test environments.

The present invention is readily distinguishable from the oxygen (air) cathodes described by Iliev et al in that according to this invention, larger active carbon particles are "Teflonated" (discontinuously coated with much smaller PTFE particles) with subsequent fibrillation followed by heat treating and forming into a coherent, self-sustaining sheet without sintering. The active layers when incorporated into an electrode, result in an active layer having a desirable combination of tensile strength with resistance to blistering under high current densities in use. It will be observed the conditions employed in formation of the active layer are insufficient to effect sintering of the PTFE contained therein.

British Pat. No. 1,284,054 to Boden et al is directed to forming an air-breathing electrode containing an electrolyte within an air-depolarized cell. This air-breathing electrode is made by hot pressing a fluoropolymer sheet, containing a pore-forming agent, on to a catalyst composition (containing silver) and metallic grid member. According to page 3 of said British patent, the PTFE-pore-forming agent-paraffin wax containing wetproofing sheet is subjected to a solvent wash to remove the paraffin wax (lubricant and binder) and then sintered in a sintering furnace at the appropriate temperatures for sintering and while it still contains the pore-forming particles. It is then ready for application to the catalyst composition of the air electrode for the hot pressing operation. Hot pressing involves the use of pressures ranging from about 5,000 to about 30,000 psi in conjunction with temperatures ranging from 200° F. to 400° F. The process of the present invention is readily distinguishable from said Boden et al British Patent in that the present invention avoids the use of wax, avoids the trouble and expense of removing wax and does not employ sintering and high pressures. Moreover, Boden et al do not use a discrete active layer containing catalyst in their process.

The publication "Advances in Chemistry Series", copyright 1969, Robert F. Gould (Editor), American Chemical Society Publications, contains at pages 13 to 23 an article entitled "A Novel Air Electrode" by H. P. Landi et al. The electrode described contains 2 to 8 percent PTFE, is produced without sintering and is composed of graphitic carbon (ACCO Graphite) or metallized graphitic carbon particles blended with a PTFE latex and a thermoplastic molding compound to form an interconnected network which enmeshes the filter particles. This blend is molded into a flat sheet and the thermoplastic is then extracted. The present process employs non-graphitic active carbons, significantly higher concentrations of PTFE in the active layer while avoiding the use of thermoplastic molding compound and avoiding the necessity to remove same. Also, the active layer of this invention is formed by rolling a prefibrillated granular mix and no molding step is necessary.

No indication is given by Landi et al as to the stability and durability of their air electrode and no life testing or data is included in said article.

U.S. Pat. No. 3,368,950 discloses producing fuel cell electrodes by electrochemically depositing a uniform noble metal coating on a thin less noble metal body, for example, platinum on gold; platinum on silver; palladium on silver; gold on silver; rhodium on silver; gold on copper; silver on copper; nickel on iron or platinum on iron.

U.S. Pat. No. 3,352,719 is directed to a method for making silver-catalyzed fuel cell electrodes by plating a silver catalyst on a carbon or nickel substrate.

British Pat. No. 1,222,172 discloses use of an embedded conductive metal mesh or screen (35) within a formed electrode (30) containing a particulate (34) matrix of polytetrafluoroethylene polymer particles (21) in which there are located dispersed electrically conductive catalyst particles (24) which can be silver-coated nickel and silver-coated carbon particles, viz., two different types of silver-coated particles in the PTFE particulate matrix in an attempt to overcome an increase in resistance as silver is consumed in the gas diffusion fuel cells to which said British patent is directed.

U.S. Pat. No. 3,539,469 is directed to the use of silver-coated nickel particles (powder) in a fuel cell catalyst to economize on the use of silver. This patent states that silver, as an oxygen activation catalyst, has been known and heretofor used.

None of the references mentioned herein disclose an asymmetric woven wire mesh current distributor which can be used in accordance with this invention.

The laminates of this invention contain active layers having from about 60 to about 85 wt.% active carbon, the remainder being unsintered fibrillated polytetrafluoroethylene in intimate admixture with said active carbon. These active layers, per se, are described and claimed in U.S. Pat. No. 4,379,772 entitled "Electrode Active Layer". The disclosure of this patent is incorporated herein by reference. While the hydrophobic backing layers of any one of U.S. patent application Ser. Nos. 202,582 U.S. Pat. No. 4,382,904; and 202,583 U.S. Pat. No. 4,339,325; and 202,575 and the woven asymmetric wire mesh of U.S. patent application Ser. No. 202,574 U.S. Pat. No. 4,354,917 can be used as the backing layer and current distributor, respectively, in the laminates of this invention; the present laminates can incorporate any backing layer and any current distributor, respectively, including those of the prior art disclosed herein. Of course, then such laminates will not possess the specific desirable characteristics obtainable in the specific laminates formed and referred to herein. Nevertheless the present invention in its broadest aspects embraces the active layer of U.S. Pat. No. 4,379,772 with any wetproofing (backing) layer and any current distributor.

DETAILED DESCRIPTION OF THE INVENTION

Backing (Wet-proofing) Layer

The three-layer laminated electrodes produced in accordance with this invention contain an outer wet proofing or backing layer, the purpose of which is to prevent electrolyte from coming through the active layer and wetting the gas side of the active layer and thereby impeding access of the oxygen (air) gas to the active layer. According to one preferred embodiment of this invention, the backing layer is a porous one containing a pore former and Teflon only and prepared in accordance with a one pass process, viz., wherein it is formed as a coherent, self-sustaining backing layer sheet by a single pass through heated rollers.

In accordance with another embodiment of this invention, the porous backing layer contains not only a pore former and polytetrafluoroethylene particles, but also contains either electroconductive carbon black particles, per se, or carbon black particles which have been partially fluorinated to certain extents of fluorination, as will be pointed out in more detail hereinafter.

When it is desired to employ a porous PTFE backing layer made by the single-pass procedure and containing chiefly only a pore former and PTFE; the backing layer can be prepared in accordance with the process described and claimed in copending U.S. Pat. No. 4,339,325 entitled "One Pass Process for Forming Electrode Backing Sheet". The disclosure of this patent is incorporated herein by reference. When using such a backing layer the Teflon particles are usually employed in the form of a non-aqueous dispersion, e.g. the dupont Teflon 6A series. Teflon 6A, for example, consists of coagulates or agglomerates having a particle size of about 500 to 550 microns which were made by coagulating (agglomerating) PTFE dispersed particles of about 0.05 to 0.5 microns and having an average particle size of about 0.2 microns. These agglomerates are dispersed in an organic liquid medium, usually a lower alkyl alcohol, such as isopropanol, and broken down by beating, e.g., in a high speed Waring blender for about three minutes to redisperse same and break up the larger particles into smaller Teflon particles.

Then pulverized sodium carbonate particles in isopropanol, having particle sizes ranging from about 1 to about 40 microns, and more usually from about 5 to 20 microns, and preferably having an average (Fisher Sub-Sieve Sizer) particle size of 3 to 4 microns, are added to the alcohol dispersion of the blended PTFE particles in a weight ratio ranging from about 30 to about 40 weight parts of PTFE to about 60 to about 70 weight parts of sodium carbonate to result in an intimate dispersion of PTFE with pore former. Then the alcohol is removed and the PTFE-Na$_2$CO$_3$ mix particles are dried.

Subsequent to drying, the particulate PTFE-sodium carbonate mixture is subjected to sigma mixing under conditions which mildly "fiberize" (fibrillate) the PTFE. The sigma mixing is conducted in a Brabender Prep Center Model D101 with attached Sigma Mixer with a charge of approximately 140 g. of mix. This fibrillation is performed for approximately 10 to 20, e.g., 15 minutes at 100 rpm and 15° to 25° C., e.g. 20° C.

After fibrillating and before passing the mix between rolls, the fibrillated PTFE-pore former mix is chopped for 1–20 seconds, e.g., 5 to 10 seconds.

The mildly "fiberized" chopped mixture of PTFE-sodium carbonate is then dry rolled into sheet form using a single pass through one or more sets of metal, e.g., chrome plated steel rolls. Temperatures of about 70° to about 90° C. and roll gaps ranging from about 5 to about 15 mils are customarily employed. The conditions employed in the dry rolling are such as to avoid sintering of the PTFE particles.

Throughout this disclosure there appear examples. In each such example, all parts, percents and ratios are by weight unless otherwise indicated.

EXAMPLE 1

Two hundred cubic centimeters of isopropyl alcohol were poured into an "Osterizer" blender. Then 49 grams of duPont 6A polytetrafluoroethylene were placed in the blender and the PTFE-alcohol dispersion was blended at the "blend" position for approximately one minute. The resulting slurry had a thick pasty consistency. Then another 100 cc of isopropyl alcohol were added in the blender and the mixture was blended (again at the "blend" position) for an additional two minutes.

Then 91 grams of particulate sodium carbonate in isopropanol (Ball milled and having an average particle size of approximately 3.5 microns as measured by Fisher Sub Sieve Sizer) were added to the blender. This PTFE-sodium carbonate mixture was then blended at the "blend" position in the "Osterizer" blender for three minutes followed by a higher speed blending at the "liquefying" position for an additional one minute. The resulting PTFE-sodium carbonate slurry was then poured from the blender on to a Buchner funnel, filtered, and then placed in an oven at 80° C. where is was dried for three hours resulting in 136.2 grams yield of PTFE-sodium carbonate mixture. This mixture contained approximately 35 weight parts of PTFE and 65 weight parts of sodium carbonate.

This material was then fibrillated mildly in a Brabender Prep Center D101 for 15 minutes at 100 rpm and 20° C. using the Sigma Mixer Blade Model 02-09-000 as described above. The thus fibrillated mixture was then chopped for 5 to 10 seconds in a coffee blender (i.e. Type Varco, Inc. Model 228.1.00 made in France) to produce a fine powder.

The chopped, fibrillated mixture was then passed through six inch diameter rolls, heated to about 80° C. and using a roll gap typically 0.008 inch (8 mils). The sheets are formed directly in one pass and are ready for use as backing layers in forming electrodes, e.g., oxygen cathodes, with no further processing beyond cutting, trimming to size and the like.

The thus formed layers (after removal of the pore-forming agent) are characterized as porous, self-sustaining, coherent, unsintered uniaxially oriented backing (wetproofing) layers of fibrillated polytetrafluoroethylene having pore openings of about 0.1 to 40 microns (depending on the size of the pore-former used) and exhibit air permeability particularly well suited for oxygen (air) cathodes.

EXAMPLE 2

(Re-Rolling)

The procedure of Example 1 was repeated with the exception that after the PTFE/Na$_2$CO$_3$ sheet was passed through the rollers once it was folded in half and re-rolled in the same direction as the original sheet. A disc of this material was pressed at 8.5 tons per square inch and 115° C. and then washed with water to remove the soluble pore former. Permeability tests conducted on this sample resulted in a permeability of 0.15 ml of air/minute/cm$^2$/cm of water pressure as compared to a test sample prepared according to EXAMPLE 1 and pressed and washed as above which gave a permeability of 0.21 ml of air/minute/cm$^2$/cm of water pressure. The permeability test was done according to the method of A.S.T.M. designation E 128-61 (Maximum Pore Diameter and Permeability of Rigid Porous Filters for Laboratory Use) in which the test equipment is revised to accept air electrodes for test rather than the rigid filters for which the test was originally designed. The revision is a plastic fixture for holding the air electrode in place of the rubber stopper shown in FIGS. 1 and 2 of said A.S.T.M. standard.

Apparently folding and re-rolling are counter productive to air permeability, an important and desired property in a backing layer for an oxygen cathode. Moreover, folding and re-rolling may form laminae which give rise to delamination of the backing layer in use, e.g, in a chlor-alkali cell. EXAMPLE 3

(Single Pass with Volatile Pore Former)

A porous Teflon sheet was fabricated using a mixture of 40 wt.% ammonium benzoate (a volatile pore former) and 60 wt.% PTFE prepared as in EXAMPLE 1. The sheets were fabricated by passing the above mix (fibrillated and chopped) through the 2 roll mill once. The rolled sheet was then pressed at 8.5 tons per square inch and 65° C. The volatile pore former was then removed by heating the sheet in an oven at 150° C. Substantially all of the volatile pore former was thus sublimed leaving a pure and porous PTFE sheet. Permeability of these sheets averaged 0.2.

CONDUCTIVE BACKING LAYER

On the other hand, when the laminate has a backing layer containing carbon particles to enhance the conductivity thereof, either unmodified carbon blacks or partially fluorinated carbon blacks, e.g., partially fluorinated acetylene black particles, can be utilized to impart conductivity to the backing layer.

When utilizing unfluorinated carbon black particles to impart the conductivity to the PTFE-containing porous backing layer, carbon blacks can be employed which are electrically conductive. The term carbon black is used generically as defined in an article entitled "FUNDAMENTALS OF CARBON BLACK TECHNOLOGY" by Frank Spinelli appearing in the August, 1970 edition of *AMERICAN PRINT MAKER* to include carbon blacks of a particulate nature within the size range of 50 to 2000 angstrom units which includes a family of industrial carbons such as lampblacks, channel blacks, furnace blacks, thermal blacks, etc.

A preferable form of unmodified (unfluorinated) carbon black is acetylene carbon black, e.g., made from acetylene by continuous thermal decomposition, explosion, by combustion in an oxygen-deficient atmosphere, or by various electrical processes. Characteristically, acetylene black contains 99.5+ weight percent carbon and has a particle size ranging from about 50 to about 2000 angstroms units. The true density of the acetylene black material is approximately 1.95 grams per cubic centimeter. More preferably the acetylene black is a commercially available acetylene black known by the designation "Shawinigan Black" and has a mean particle size of 425 angstroms with a standard deviation of about 250 angstroms. Such acetylene blacks are somewhat hydrophobic, e.g., as demonstrated by the fact that the particles thereof float on cold water but quickly sink in hot water.

The hydrophobic electroconductive electrode backing layers were prepared in accordance with this invention by combining the PTFE in particulate form as a dispersion with the carbon black particles as described above. According to a preferred embodiment of this invention, the acetylene carbon black employed is that having an average particle size of approximately 425 angstrom units with the remainder having a standard deviation of 250 angstrom units. The range of particle size is from about 50 to about 2000 angstroms.

These acetylene black particles are mixed with PTFE particles by adding a commercially available aqueous dispersion, e.g. duPont "Teflon 30" to the carbon black, also dispersed in water to form an intimate mixture thereof. The "Teflonated" mix can contain from about 50 to about 80 wt. % carbon black and from about 20 to about 50 wt % PTFE. Water is removed and the mix is dried. The dried Teflonated mix can then be heated at 275° to 300° C. for 10 to 80 minutes to remove a substantial portion of the wetting agent used to disperse the PTFE in water. Approximately 50 weight percent of this mix is fibrillated (as described above in relation to the "one pass" process) and then mixed with the remaining unfibrillated mix. A water soluble pore forming agent, e.g., sodium carbonate, can be added thereto and the "Teflonated" carbon black and pore former mixed.

Such conductive PTFE/carbon black-containing backing layers characteristically have thicknesses of 5 to 15 mils and may be produced by filtration or by passing the aforementioned acetylene black-PTFE mixes through heated rollers at temperatures of 65° to 90° C. or by any other suitable technique.

Then these backing layers are laminated with a current distributor and the active layer as disclosed herein. The active carbon can be conditioned and used with or without a precious metal catalyst, e.g., platinum, silver, etc. on and/or within the pores thereof by the deashing conditioning procedure described and claimed in accordance with U.S. Pat. No. 4,379,077 and having the title "Active Carbon Conditioning Process" and U.S. Pat. No. 4,357,077 entitled "Post Platinizing High Surface Carbon Black" and U.S. Pat. Application Ser. No. 202,579, abandoned, filed in the name of Frank Solomon and entitled "Process For Catalyst Preparation". The disclosure of these three patents are incorporated herein by reference.

The testing of air electrodes employing such backing layers in the corrosive alkaline environment present in a chlor-alkali cell has revealed a desirable combination of electroconductivity with balanced hydrophobicity and said layers are believed to have achieved a desired result in the oxygen (air) cathode field.

EXAMPLE 4

(Preparation of PTFE/Carbon Black)

One and one-half (1.5) grams of "Shawinigan Black," hereinafter referred to as "SB," were suspended in 30 mls of hot water (80° C.) and placed in a small ultrasonic bath (Model 250, RAI Inc.) where it was simultaneously stirred and ultrasonically agitated.

Sixty-eight one hundredths (0.68) ml of du Pont "Teflon 30" aqueous PTFE dispersion was diluted with 20 mls of water and added dropwise from a separatory funnel to the SB dispersion gradually, over approximately a 10-minute period with stirring, followed by further stirring for approximately one hour. This material was then filtered, washed with water and dried at 110° C. The dried material was spread out in a dish and heated at 300° C. in air for 20 minutes to remove the PTFE wetting agent (employed to stabilize PTFE in water dispersion in the first instance.

EXAMPLE 5

(PTFE/SB Wetproofing Layer by Filtration Method)

A PTFE/SB conductive, hydrophobic wetproofing layer or sheet was prepared by the filtration method as follows: two hundred twenty five (225) milligrams of the PTFE discontinuously coated SB, prepared in accordance with Example 1, were chopped in a small high speed coffee grinder (Varco Model 228-1, made in France) for about 30 to 60 seconds and then dispersed in 250 mls of isopropyl alcohol in a Waring Blender. This dispersion was then filtered onto a "salt paper," viz., NaCl on filter paper, of 17 cm$^2$ area to form a cohesive, self-sustaining wetproofing layer having 10.6 mg/cm$^2$ by weight (20 mg total).

Resistivity of this wetproofing layer was measured and found to be 0.53 ohm-centimeters. The resistivity of pure PTFE (from "Teflon 30") is greater than 10 ohm-cm by way of comparison.

The resistivity of the PTFE/SB carbon black wetproofing layer illustrates that it is still low enough to be useful in forming electrodes when in intimate contact with a current distributor.

Permeability is an important factor in high current density operation of a gas electrode having hydrophobic (conductive or nonconductive) backing, viz., a wetproofing or liquid barrier layer.

The wetproofing layers used in this invention have adequate permeability to be comparable to that of pure PFTE backings (even when pressed at up to 5 tons/in$^2$) yet have far superior electroconductivity.

CONDUCTIVE BACKING LAYER CONTAINING PARTIALLY FLUORINATED CARBON BLACK

When, in accordance with this invention, conductive backing layers are employed it is also contemplated to use partially fluorinated carbon black, e.g. the partially fluorinated carbon black backing layers as disclosed and claimed in U.S. Pat. No. 4,382,904 entitled "Electrode Backing Layer and Method of Preparing". The disclosure of this patent application is incorporated herein by reference. Such partially fluorinated carbon blacks are preferably acetylene blacks which are subjected to partial fluorination to arrive at compounds having the formula $CF_x$, wherein x ranges from about 0.1 to about 0.18.

The hydrophobicity of the already hydrophobic acetylene black particles is enhanced by such partial fluorination as was observed from comparative experiments wherein the unfluorinated acetylene black particles floated on cold water but quickly sank in hot water versus the partially fluorinated acetylene blacks, fluorinated to the extent of x being about 0.1 to about 0.18, which floated on hot water virtually indefinitely and could not be made to pierce the meniscus of the water.

Such hydrophobic electrode backing layers (containing $CF_x = 0.1$ to 0.18 partially fluorinated carbon black) were prepared by combining the PTFE in particulate form as a dispersion with the partially fluorinated acetylene black particles.

The partially fluorinated carbon black particles are suspended in isopropyl alcohol and a dilute aqueous dispersion of PTFE (2 wt.% PTFE) is added gradually thereto. This dilute dispersion is made from PTFE dispersion of 60 weight parts of PTFE in 40 weight parts of water to form an intimate mixture of $CF_x = 0.1$ to $0.18$/PTFE.

The PTFE/$CF_{0.1\ to\ 0.18}$ mix was then filtered, dried, treated to remove the PTFE wetting agent (by heating at 300° C. for 20 minutes in air or extracting it with chloroform), and briefly chopped to form a granular mix and then fabricated into sheet form either by (a) passing between heated rollers (65° to 90° C.) or (b) by dispersion of said PTFE/$CF_x = 0.1$ to 0.18 particles in a liquid dispersion medium capable of wetting said particles and filtration of a salt (NaCl) bed previously deposited on filter paper or like filtration media, of (c) by spraying the $CF_{0.1\ to\ 0.18}$/PTFE mix in a mixture of water and alcohol, e.g., isopropyl alchol on an electrode active layer/current distributor composite assembly and drying to yield a fine-pore wetproofing layer. The "Teflonated" mix can contain from about 50 to 80 wt % $CF_{0.1\ to\ 0.18}$ and about 20 to 50 wt.% PTFE.

In any case, a pore-former can be incorporated into the $CF_{0.1\ to\ 0.18}$/PTFE mix prior to forming the wetproofing layer or sheet. The pore-former can be of the soluble type, e.g., sodium carbonate or the like, or the volatile type, e.g., ammonium benzoate or the like. The use of ammonium benzoate as a fugitive, volatile pore-former is also described and claimed in U.S. Pat. No. 4,339,325 referred to above.

Whether the wetproofing sheet is formed by rolling, filtration or spraying, the pore-former can be removed by washing (if a soluble one) or heating (if a volatile one) either prior to laminating or after. In cases where a soluble pore-former is used, the laminate is preferably given a hot (50° to about 100° C.) soak in an alkylene polyol, e.g. ethylene glycol or the like, prior to water washing for 10 to 60 minutes. The ethylene glycol hot soak combined with water washing imparts enhanced resistance of such laminated electrodes to blistering during water washing and is the subject matter described and claimed in U.S. Pat. No. 4,357,262 entitled "Electrode Layer Treating Process" filed in the name of Frank Solomon. The disclosure of this application is incorporated herein by reference.

When the wetproofing layer is formed by filtration, it can be released from the filter media by washing with water to dissolve the salt bed, drying and pressing lightly to consolidate same, followed by laminating to the current distributor and active layer. Alternatively, the filter paper/salt/wetproofing layer can be laminated to the current distributor and active layer (with the filter paper side away from the current distributor and the wetproofing layer side in contact with the current distributor) followed by dissolving the salt away.

The testing of the electroconductive, hydrophobic backing layers of this invention, in the corrosive environment of use of a chlor-alkali cell has revealed a desirable combination of electroconductivity with balanced hydrophobicity and said layer is believed to have achieved a much desired result in the oxygen (air) cathode field.

The testing of such partially fluorinated backing layers in the corrosive alkaline environment of use in a chlor-alkali cell has revealed a desirable combination of electroconductivity with balanced hydrophobicity and said layers are believed to have achieved a desired result in the oxygen (air) cathode field.

The formation and testing of the partially fluorinated carbon-containing backing layers will be described in greater detail in the examples which follow. The term "SBF" as used herein means partially fluorinated "Shawinigan Black".

EXAMPLE 6

Preparation of SBF 0.17/PTFE Mix

One and one-half (1½) g. of SBF 0.17 were suspended in 30 ml of isopropyl alcohol (alcohol wets SBF). The mixture was placed in a small ultrasonic bath, Model 250, RAI, Inc. and was simultaneously stirred and subjected to ultrasonic agitation.

Sixty-eight one hundredths (0.68) ml of duPont "Teflon 30" dispersion were diluted with 20 ml $H_2O$ and added dropwise from a separatory funnel to the SBF 0.17, slowly (i.e. 10 min). After further stirring, (1 hr.), the material was filtered, washed and dried at 110° C.

A layer was made by a filtration method. Of the above material, 225 mg was chopped in a small high speed coffee grinder, then dispersed in 250 ml isopropyl alcohol in a Waring Blender and filtered on to a sodium chloride (salt) layer deposited on a filter paper of 19 $cm^2$ area to form a layer having an area density of 10.6 mg/$cm^2$. Resistivity was measured and found to be 8.8 ohm-cm.

The SB control strip was prepared in accordance with Examples 4 and 5 above. Resistivity of this SB control strip was found to be 0.53 ohm cm. Although the resistivity of the SBF strip is 16.6 times as great as that of said control strip, it is still low enough to be useful when a mesh conductor is embedded in the hydrophobic backing. Pure PTFE has a resistivity of greater than $10^{15}$ ohm-cm by way of comparison.

Gas permeability is an important property for high current density operation of a gas electrode having a hydrophobic (conductive or nonconductive) backing. The SBF-TFE backing layer prepared as above had adequate air permeability comparable to the "one pass" PTFE backings of Examples 1 and 3 above even when pressed to 5 tons per square inch.

THE ACTIVE LAYER

In forming the three-layer laminate electrode of this invention, there is employed an active layer having catalyzed or uncatalyzed preferably deashed active carbon particles discontinuously coated by and in intimate mixture with smaller PTFE particles in a weight ratio of about 15 to 40 wt.% of fibrillated PTFE to about 60 to 85 wt.% of active carbon. Such active layers are preferably made in accordance with the procedure described and claimed in U.S. Pat. No. 4,379,772 filed in the names of Frank Solomon and Charles Grun and entitled "Electrode Active Layer," the disclosure of which is incorporated herein by reference. This procedure involves adding a dilute dispersion of polytetrafluoroethylene particles to a suspension of larger active carbon particles to discontinuously coat same; fibrillating the discontinuously coated particles to form a mix; comminuting the fibrillated mix to yield a granular mix; and forming the granular mix into sheet form, preferably by hot rolling it at temperatures of from about 60° to 90° C. Where it is desired to form ultra thin electrode active layers, the "Teflonated" active carbon can be deposited upon a salt (NaCl) bed on a filter paper (as a foring medium), pressed, released from said filter medium and then used as the active layer in an oxygen (air) cathode. Increases in strength and durability are imparted to such active layer structures by fibrillating the "Teflonated" active carbon particles before comminuting and rolling.

A variety of active carbons can be used herein. Active carbon is contemplated herein for use both in its unmodified (uncatalyzed) form and as catalyzed or activated with various procedures for deposition of catalytic materials therein or thereon, e.g., precious metals, such as silver, platinum, palladium, spinels, e.g., mixed oxides of nickel and cobalt such as $NiCO_2O_4$; perovskites, e.g., $CaTiO_3$, etc., as described at pages 54, 55 et seq. of *ADVANCED INORGANIC CHEMISTRY*, by F. Albert Cotton and Geoffrey Wilkinson, Third Edition, INTERSCIENCE PUBLISHERS.

Usually said active carbon particles (after conditioning as per U.S. Ser. No. 202,580, U.S. Pat. No. 4,379,077) have a B.E.T. surface area of 1000 square meters per gram ($m^2/g$) and higher, combined with an ash content of less than about 4 wt. percent. This is accomplished by deashing said active carbon (before catalyzing it) by separately contacting it with an alkali at elevated temperatures and with an acid. The term "B.E.T." surface area refers to the well known method of determining surface area according to nitrogen absorption developed by Brunauer, Emmett and Teller.

The active carbon whose use is contemplated herein encompasses a variety of materials which, in general, prior to deashing encompass a variety of amorphous carbonaceous materials generally of vegetable origin which contain inorganic residue, e.g., non-carbonaceous oxides collectively designated as ash.

In accordance with a preferred embodiment of this invention, the active carbon starting material is "RB" carbon which is a form of active carbon manufactured by Calgon, a division of Merck, and is made from bituminous coal by known procedures. This material can contain as much as approximately 23% of various oxides and components which can be collectively classified as ash. Typical analysis of the ash contained in RB carbon is as follows:

| Component | Weight Concentration |
| --- | --- |
| Silica | 43.34 |
| Alumina ($Al_2O_3$) | 29.11 |
| Iron Oxides ($Fe_2O_3$) | 20.73 |
| Others | 6.82 |

The sequential pretreatment process does not totally remove the ash content from the active carbon; but results in a substantial reduction thereof, viz., from about 70–80% or more of the ash is removed by said process, which is described and claimed U.S. Ser. No. 202,580 U.S. Pat. No. 4,379,077, previously mentioned.

Prior to contact with the alkali solution, it has been found desirable to first comminute, e.g., ball mill or otherwise divide up the active carbon particles as purchased. For example, RB active carbon was ball milled for 2 to 6 hours, and more usually about 4 hours, to reduce its particle size to from about 1 to 30 microns.

The initial stage of treatment constitutes contacting the active particles as obtained, e.g., RB carbon as mentioned above, with either an acid or alkali followed by contact with the other. E.g., during the base contacting stages the alkali material such as sodium hydroxide, potassium hydroxide, etc., is maintained at elevated temperatures ranging from about 90° to about 140° C. and several contacting steps are used over time periods of about 0.5 to 24 hours followed by one or more intermittent water washing step(s).

Then the thus treated active carbon is contacted with an acid, such as hydrochloric acid, for similar extended time periods at ambient temperatures. Between the alkali and acid contacting phases the active carbon particles can optionally be dried. However, drying is not required. Usually, the alkali is employed in the form of an aqueous solution containing from 28 to 55, and more usually from 35 to 45 wt.% alkali based on total solution. The acid content of the aqueous acid solution customarily ranges from 10 to 30 wt.% and more usually from 15 to 25 wt.% acid based on total solution.

Similarly the acid washing can be accomplished in several discrete washing steps rather than all at one time. Additionally, the contact with acid can be accomplished at lower temperatures for longer time periods. For example, the acid wash can be conducted overnight (approximately 16 hours) at room temperature. As with the alkali stage, after the acid contact; preferably the active carbon particles are water washed to remove acid and then dried. Alternatively, the acid contact stage can be done at elevated temperatures using a Soxhlet extraction constant reflux apparatus, e.g., using HCl, HBr, etc., at 100° to 130° C., viz., constant boiling mineral acids, each having a respective boiling range, for about 0.5 hour or less. While many acids may suitably be used, the acid of choice is hydrochloric acid.

The conditioning as per U.S. Ser. No. 202,580, U.S. Pat. No. 4,379,077 results in substantial reduction of the aforementioned ash content of the active carbon particles. Typically, when using active carbon having 10 to 23 wt.% ash content and an initial B.E.T. surface area of 600 to 1500 $m^2/g$ (before deashing), reductions of ash content to from 1.6 to 3.6 wt.% and increases in B.E.T. surface area as much as fifty (50) percent are produced by such deashing.

Commercially available ball milled "RB carbon" was found to have an ash content of approximately 12% as received. This "RB carbon" was treated in 38% KOH for 16 hours at 115° C. and found to contain 5.6% ash content after a subsequent furnace operation. The alkali-treated "RB carbon" was then treated (immersed) for 16 hours at room temperature in 1:1 aqueous hydrochloric acid (20% concentration). The resulting ash content had been reduced to 2.8%.

Alternatively, a commercially available (Calgon) active carbon known as "PWA" was first acid washed to an ash content of 4.6% and then treated in 38% KOH for 16 hours at 115° C. The resulting ash content was 1.6%.

The deashed particles are then catalyzed by contact with a precursor of a precious metal catalyst. In the event that silver is to be deposited within the pores of the active carbon, it is preferred to soak the carbon in an aqueous solution of silver nitrate followed by removal of excess silver nitrate and chemical reduction with aqueous alkaline formaldehyde. Preferably this is done as described and claimed in U.S. Pat. application Ser. No. 202,579 (abandoned) filed in the name of Frank Solomon of even data herewith and entitled "Process for Catalyst Preparation." The disclosure of this application is incorporated herein by reference.

On the other hand in the event that it is desired to deposit platinum within the pores of the active carbon material, chloroplatinic acid viz., $H_2PtCl_6.6H_2O$, is one preferred precursor, followed by removal of excess chloroplatinic acid and chemical reduction using alkaline sodium borohydride or formaldehyde as a reducing agent. The reduction can be accompanied with the use of heat or it can be done at ambient room temperatures. According to another preferred embodiment; the platinum is derived from $H_3Pt(SO_3)_2OH$ by the procedure set forth in U.S. Pat. No. 4,044,193. After catalysis, the active carbon particles are filtered and vacuum dried in preparation for "Teflonation".

"Teflonated," fibrillated, active carbon-containing active layers characteristically have thicknesses of 0.005 to 0.025 (5 to 25 mils) with corresponding tensile strengths ranging from about 100 to 200 psi as compared to tensile strengths of 50 to 80 psi for unfibrillated active layers.

The active carbon particles are formulated into an aqueous suspension with stirring to prepare for "Teflonation" by gradual addition thereto of a dilute dispersion of PTFE as noted above. Prior to distribution, the "Teflonated" active carbon can be blended or mixed with a soluble or volatile particulate pore forming agent, e.g., sodium carbonate, ammonium benzoate, etc., having a particle size of about 0.1 to 40 microns and more usually about 0.5 to 20 microns. Preferably a pore-forming agent is used to enhance the permeability of the active layer.

The previously "Teflonated" active carbon mixture can be fibrillated as described above in conjunction with backings for approximately 1 to 20 minutes, e.g., 2 to 10 minutes, at from 20 to 120 revolutions per minute at ambient or higher temperature, viz., 15° to 75° C., e.g., 20° to 50° C.

After fibrillation and before forming the active layer sheets, the fibrillated mix can be chopped or otherwise comminuted for 1 to 60 seconds to yield a granulated mix.

Subsequent to chopping, the fibrillated, "Teflonated" active carbon is heated at from 60° to 90° C. and usually at temperatures ranging from about 75° to 85° C. and passed through six inch diameter chrome-plated steel rolls at roll gaps of 5 to 20 mils, more usually 5 to 10 mils, viz., 0.005 to 0.010 inch. In place of forming the active layer by hot rolling, the active layers can be formed by deposition on a filter medium, as described above. A soluble pore-former, if one is previously incorporated into the active layer, can be then removed by washing the thus-formed sheet. Alternatively the removal of the pore former can be deferred until after laminating the active layer to a current distributor and hydrophobic backing. In the event no pore former is employed; the sheet can be used (as is) as the active layer of an electrode.

The preparation of such active layers will be further illustrated in the examples which follow.

EXAMPLE 7

100 grams of RB active carbon were ball milled for 4 hours in water. This carbon was subsequently treated with 1600 ml or 38% NaOH for an hour at 110°–120° C. with stirring. It was then filtered and washed. This treatment was repeated three times, then followed by a room temperature overnight soak in 1:1 HCl and a final washing and drying in air at 110° C.

20 g of carbon, so prepared, were then platinized in a ratio of 28 parts of carbon to 1 part Pt, using $H_3Pt(SO_3)_2OH$ in accordance with the procedure of U.S. Pat. No. 4,044,193. Twenty (20) grams of carbon were suspended in 333 ml. of water, and 3.57 ml of $H_3Pt(SO_3)_2OH$ (200 g. Pt/liter solution) were added and then decomposed to hydrous platinum oxide by the addition of 8.6 ml. of 35% $H_2O_2$. After filtering, washing, and air drying at 140° C., the catalyzed carbon was ready for the next step, "Teflonation".

20 g. of catalyzed carbon were suspended in 300 ml. water with stirring. 8.4 ml. of "Teflon 30" dispersion were separately diluted in 300 ml. of water. The diluted Teflon 30 dispersion was slowly added to the catalyzed carbon suspension. After coagulation, the mixture was washed and dried.

The mix was weighed and was found to be 25 g. The 25 g. mix was then fibrillated by shear blending in the Brabender Prep Center, in measuring head type R.E.O.-6 using medium shear cams or blades. The mix was lubricated with 28 cc. of 30% isopropanol in water and was kneaded for 2½ minutes at 25 rpm. It was then vacuum dried.

3 g. of mix were chopped 30 seconds in a Varco Mod. 228-1 coffee grinder; and then rolled at 75° C. through 6 inch diameter rolls at a roll separation of 0.007 inches. The rolled sheet as 0.010 inches thick. At this point, the sheet (coded E-413) was ready for incorporation into an electrode.

EXAMPLE 8

Active carbon was prepared as recited in Example 7 up to the point of catalyzing. To catalyze the carbon, 16.7 g. of carbon were suspended in 396 ml. $H_2O$ containing 21.3 g. $AgNO_3$ and stirred for two hours. The carbon was then filtered to remove all excess liquid and the filter cake was then slurried in a previously prepared solution of 250 ml. $H_2O$, 25 ml 30% NaOH, and 18.3 ml of 37% $Ch_2O$ and was held at 85° C. for 60 minutes with continuous stirring.

The resulting silvered carbon was then washed and dried, and processed to sheet material following the steps of Example 7 in the same sequence, with only minor variations. The resultant sheet material was coded E-305. Its carbon to silver ratio was 5:1.

EXAMPLE 9

A third sheet material was prepared in exactly the same manner as those described in Examples 7 and 8 with the exception that the catalyzing step was omitted. The code for this material was E-421.

THE CURRENT DISTRIBUTOR LAYER

The current distributor layer, which is usually positioned next to and laminated to the working surface of the active layer of the three-layer laminate, can be an asymmetric woven wire mesh wherein the material from which the wire is made is selected from the group consisting of nickel, nickel-plated copper, nickel-plated iron, silver-plated nickel, and silver-plated, nickel-plated copper and like materials. In such asymmetric woven wire mesh current distributors, there are more wires in one direction than in the other direction.

The current distributor or collector utilized in accordance with this invention can be a woven or nonwoven, symmetrical or asymmetric wire mesh or grid. Generally there is a preferred current carrying direction. When the current distributor is a copper wire mesh, there should be as few wires as feasible in the non-current carrying direction. There will be found to be a minimum required for fabrication of a stable wire cloth. A satisfactory asymmetric wire cloth configuration may consist of e.g. 50 wires/inch in the warp direction but only 25 wires per inch in the fill, thus enhancing the economy and utility of the wire cloth, simultaneously.

The asymmetric woven wire current collectors referred to hereinabove are described and claimed in U.S. Pat. No. 4,354,917 filed in the name of Frank Solomon and entitled "Asymmetric Current Distributor," the disclosure of which is incorporated herein by reference. Such asymmetric woven wire mesh current distributors are useful as the current distributor in the three layer laminates of this invention.

Alternatively the current distributor can be of the plaque type, viz., a comparatively compact yet porous layer, having porosities ranging from about 30 to about 80% and made of powders of Ni, Ag or the like.

FORMING THE THREE-LAYER LAMINATES

The three-layer laminates produced in accordance with this invention usually have the active layer centrally located, viz., positioned in the middle between the backing layer on the one side and the current distributor (collector) layer on the other side. The three layers arranged as described are laminated using heat and pressure at temperatures ranging from about 100° to about 130° C. and pressures of 0.5 to 10 T/in$^2$ followed by removal from the pressing device. The laminates are preferably then subjected to a hot soaking step in ethylene glycol or equivalent polyol to enhance removal of the pore-forming agent(s) employed to form the aforementioned backing (wetproofing) layer and any bulking and/or pore-forming agent optionally included in the active layer, upon subsequent washing(s) with water.

The laminating pressures used will depend on whether or not electro-conductive (carbon black) particles have been included in the backing layer along with the PTFE. Thus when using pure Teflon, viz., Teflon with pore former only, pressures of 4 to 8 T/in$^2$ and temperatures of 90° to 130° C. are customarily employed. Upon lamination the wire mesh-type current collector is deeply embedded in the active layer.

On the other hand when using the electroconductive carbon black particles in the backing layer, pressures as low as 0.5 to 2 T/in$^2$, and more characteristically as low as 1 T/in$^2$ have been determined to be adequate to effect the bonding of the conductive backing to the active layer. Of course, higher laminating pressures can be employed so long as the porosity of the structure is not destroyed.

The three-layer laminates of this invention can be formed using a variety of backing layers and current distributors. The following examples further illustrate their preparation and testing in corrosive alkaline environments and at current densities such as are employed in chlor-alkali cells, fuel cells, batteries, etc.

EXAMPLE 10

Electrodes were prepared from each of the above active layer sheets made in accordance with Examples 7, 8 and 9 by laminating a current collector, silver plated 50×50×0.005 nickel wire cloth, and a hydrophobic gas diffusion layer containing 65% sodium carbonate and 35% Teflon to each of the active layer sheets with the current distributor being in contact with the working surface of the active layer and the opposite surface in contact with the backing layer prepared as in Example 1.

The lamination is done in a hydraulic press at 8.5 tons/in$^2$ and 115° C., and is followed by hot soaking in ethylene glycol, as described above, water washing (to remove pore former) and drying.

The test electrodes whose results are described and tabulated below were coded:
E413 (Pt catalyst-Example 7)
E305 (Ag catalyst-Example 8)
E421 (no catalyst-Example 9)

The electrodes were mounted in test cells which were filled with 30% NaOH at 80°±5° C. Air flowed across the gas side at four times the theoretical requirement for operation of an oxygen cathode. The operating voltage was checked at each current density noted. Voltage was indicated by an Hg-HgO reference electrode which communicated with the test electrode by a Luggin capillary. An inert counter-electrode served as anode of the cell while the electrodes were tested as air depolarized cathodes.

The table below indicates the results obtained.

| Current Density (Milliamps/cm$^2$) | Voltage vs. Hg/HgO Reference | | |
| --- | --- | --- | --- |
| | E413 | E305 | E421 |
| 40 | −.09 | −.11 | −.13 |
| 117 | −.14 | −.17 | −.16 |
| 196 | −.17 | −.19 | −.18 |
| 276 | −.20 | −.23 | −.19 |
| 355 | −.24 | −.28 | −.22 |
| 500 | −.39 | −.44 | −.35 |

It will be noted that differences between electrodes are small. Performance of all electrodes cited is considered high.

EXAMPLE 11

A three layer laminate was prepared using a conductive carbon black-PTFE hydrophobic layer positioned between a current collector and an active layer. The layers were pressed together at 1½ tons per square inch and 115° C. to form a completed electrode.

The hydrophobic backing layer consisted of 70 parts "Shawinigan Black" and 30 parts "Teflon" derived from "Teflon 30", and was rolled to form a sheet whose thickness was 0.012 inches.

The active layer consisted of 64 parts "RB" deashed carbon, 16 parts platinum deposited on said RB carbon, and 20 parts of "Teflon" derived from "Teflon 30", and was fibrillated as disclosed hereinabove and formed on a salt (NaCl) bed filter paper. Performance was enhanced by extracting this mix with chloroform in a Soxhlet extractor.

The current collector was a silver plated 50×50×0.005 inch nickel wire mesh and was positioned on the air side of the electrode.

When tested in a solution of 4 molar NaOH and 2 molar $NaAlO_2$ at 60° C.; a voltage of 0.22 volts versus a mercury/mercuric oxide reference electrode was observed at a current density of 500 milliamperes per square centimeter. This was deemed an excellent result and indicated that said laminate would be especially useful as a gas electrode in a battery.

What is claimed is:

1. In a laminated oxygen cathode comprising an active layer or sheet laminated on its working surface to a current distributor and on its opposite surface to a polytetrafluoroethylene-containing wetproofing layer, the improvement comprising said active layer or sheet being formed from a fibrillated mixture of unsintered polytetrafluoroethylene and active carbon particles surface area of at least about 1000 $m^2/g$ or more and a particle size of about 1 to about 30 microns.

2. An oxygen cathode as in claim 1 wherein said active carbon contains a precious metal catalyst.

3. An oxygen cathode as in claim 2 wherein said precious metal is platinum.

* * * * *

UNITED STATES PATENT AND TRADEMARK OFFICE
CERTIFICATE OF CORRECTION

PATENT NO. : 4,456,521
DATED : June 26, 1984
INVENTOR(S) : Solomon et al

It is certified that error appears in the above-identified patent and that said Letters Patent are hereby corrected as shown below:

In Claim 1, Column 20, between Lines 5 and 6, insert the following: --consisting essentially of about 15 to about 40% by weight of polytetrafluoroethylene and about 60 to about 85% by weight of active carbon particles having an ash content of less than about 4% by weight, a B.E.T.-- (After the word "particles" in line 5 and before the word "surface" in line 6.)

Signed and Sealed this

Eleventh Day of December 1984

[SEAL]

Attest:

GERALD J. MOSSINGHOFF

*Attesting Officer*     *Commissioner of Patents and Trademarks*